United States Patent
Simon et al.

(10) Patent No.: US 8,229,366 B2
(45) Date of Patent: Jul. 24, 2012

(54) TUNABLE DUPLEXER WITH COMMON NODE NOTCH FILTER

(75) Inventors: Harris Smith Simon, Poway, CA (US); Stanley S. Toncich, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 620 days.

(21) Appl. No.: 11/101,830

(22) Filed: Apr. 8, 2005

(65) Prior Publication Data
US 2006/0229030 A1 Oct. 12, 2006

(51) Int. Cl.
*H04B 1/40* (2006.01)
(52) U.S. Cl. ........ 455/77; 455/120; 455/125; 455/150.1; 455/178.1
(58) Field of Classification Search .................... 455/78, 455/77, 82, 83, 84, 550, 575, 73, 87, 120, 455/125, 150.1, 178.1, 182.3, 191.1; 333/202, 333/207, 231
See application file for complete search history.

(56) References Cited

U.S. PATENT DOCUMENTS

| | | | |
|---|---|---|---|
| 4,842,562 A | 6/1989 | Supal | |
| 4,910,481 A * | 3/1990 | Sasaki et al. | 333/134 |
| 5,023,866 A * | 6/1991 | De Muro | 370/278 |
| 5,101,501 A | 3/1992 | Gilhousen et al. | |
| 5,267,234 A * | 11/1993 | Harrison | 370/281 |
| 5,475,871 A * | 12/1995 | Shalev et al. | 455/70 |
| 5,815,804 A * | 9/1998 | Newell et al. | 455/78 |
| 6,085,071 A | 7/2000 | Yamada et al. | |
| 6,308,051 B1 | 10/2001 | Atokawa | |
| 6,525,624 B1 * | 2/2003 | Hikita et al. | 333/133 |
| 6,714,098 B2 * | 3/2004 | Nishida et al. | 333/133 |
| 2002/0105391 A1 | 8/2002 | Yamada et al. | |
| 2002/0180558 A1 | 12/2002 | Atokawa et al. | |
| 2003/0048153 A1 * | 3/2003 | Liang et al. | 333/132 |
| 2003/0068998 A1 | 4/2003 | Yamakawa et al. | |
| 2003/0199286 A1 | 10/2003 | D du Toit | |
| 2004/0127178 A1 * | 7/2004 | Kuffner | 455/133 |
| 2004/0183624 A1 * | 9/2004 | Liang et al. | 333/134 |
| 2004/0183626 A1 * | 9/2004 | Kang et al. | 333/207 |
| 2005/0157782 A1 * | 7/2005 | Lakkis | 375/237 |

(Continued)

FOREIGN PATENT DOCUMENTS

EP 0 865 095 3/1998
(Continued)

OTHER PUBLICATIONS

Saitou, K. et al. "Tunable duplexer having multilayer structure using LTCC", Microwave Symposium Digest, 2003 IEEE MTT-S International, Philadelphia, PA, Jun. 8-13, 2003, vol. 3, pp. 1763-1766.
International Search Report and Written Opinion—PCT/US2006/013120, International Search Authority—European Patent Office—Sep. 20, 2006.
Search Authority—European Patent Office—Sep. 20, 2006.

(Continued)

*Primary Examiner* — Tuan Pham
(74) *Attorney, Agent, or Firm* — Ramin Mobarhan

(57) ABSTRACT

A mobile station with a tunable duplexer is disclosed. The mobile station includes a processor and memory in electronic communication with the processor. The mobile station includes a receive path that has a receive band reject filter in electronic communication with an antenna at a common node. The receive path also includes a receive band pass filter in electronic communication with the receive band reject filter. The mobile station includes a transmit path that has a transmit band reject filter in electronic communication with the antenna at the common node. The transmit path also includes a transmit band pass filter in electronic communication with the transmit band reject filter.

18 Claims, 6 Drawing Sheets

U.S. PATENT DOCUMENTS

2005/0164647 A1* 7/2005 Shamsaifar ............ 455/77
2005/0164888 A1* 7/2005 Hey-Shipton ............ 505/210

FOREIGN PATENT DOCUMENTS

| JP | 04010718 | 1/1992 |
| JP | 04192946 | 7/1992 |
| WO | WO02058184 A1 | 7/2002 |
| WO | WO02084781 A1 | 10/2002 |

OTHER PUBLICATIONS

European Search Report—EP10174274—Search Authority—Munich—Feb. 16, 2011.
Xiaojun, et al., "Analysis and Design of Adaptive-Band-Stop Filter," Journal of Anhui University Natural Science Edition, No. 2, 1995.

* cited by examiner

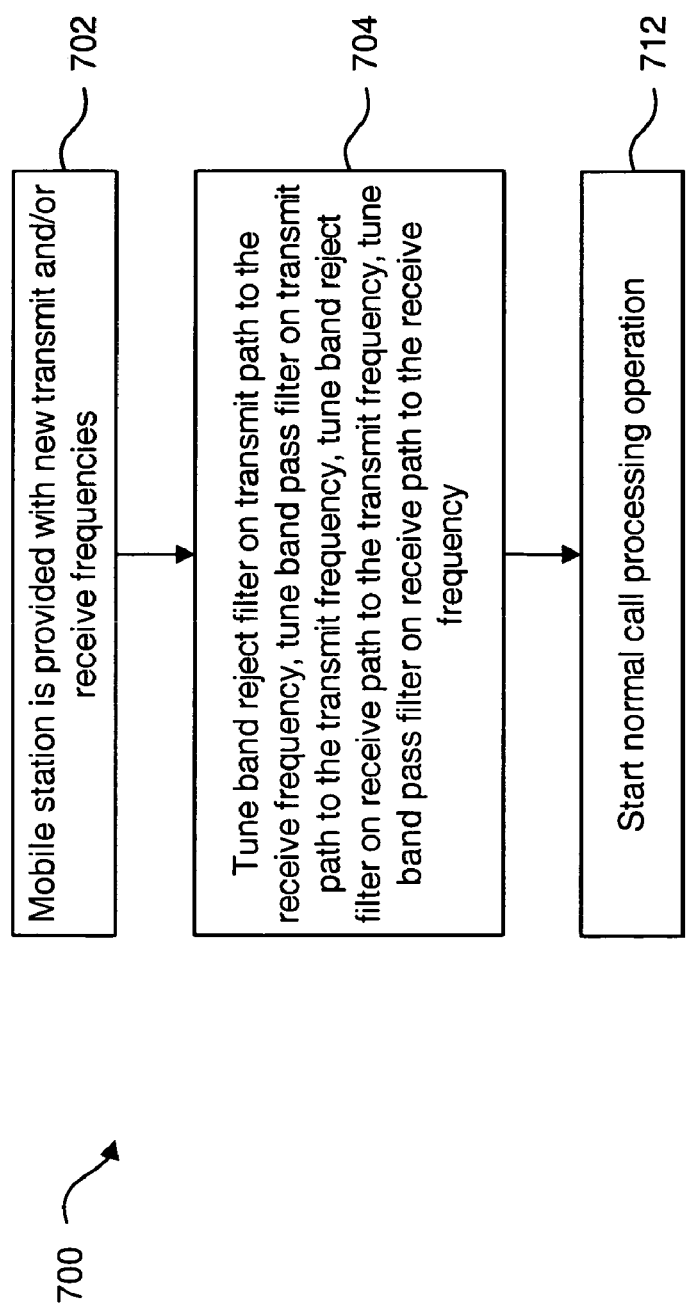

… (1)

TUNABLE DUPLEXER WITH COMMON NODE NOTCH FILTER

BACKGROUND

1. Field

The present invention relates generally to wireless communications systems, and more specifically, to systems and methods for providing a tunable duplexer with a common node notch filter.

2. Background

Full-duplex radio transceivers are used in many mobile communication devices, such as cellular telephones. Such a transceiver includes a transmit path and a receive path that both share a common antenna. Systems are designed to avoid leakage of the transmit signals into the receive path and to avoid leakage of the receive signals into the transmit path.

Miniature, full-duplex radio transceivers are used in many cellular telephones. The transmit path and the receive path of the transceiver are both coupled by a duplexer to an antenna. The duplexer performs both transmit and receive filtering. The duplexer is designed to avoid leakage of the transmit signals into the receive path and to avoid leakage of the receive signals into the transmit path.

It is desirable to provide a duplexer that adequately filters the transmit and receive signals and that isolates the transmit and receive signals with a simple topology. Accordingly, benefits may be realized by providing an improved duplexer that filters the transmit and receive signals and that isolates the transmit and receive signals.

SUMMARY

A mobile station with a tunable duplexer is disclosed. The mobile station includes a processor and memory in electronic communication with the processor. An antenna is also included. The mobile station includes a receive path that has a receive band reject filter that is tunable in electronic communication with the antenna at a common node. The receive path also includes a receive band pass filter that is tunable in electronic communication with the receive band reject filter. The mobile station includes a transmit path that has a transmit band reject filter that is tunable in electronic communication with the antenna at the common node. The transmit path also includes a transmit band pass filter that is tunable in electronic communication with the transmit band reject filter.

In some embodiments, the receive band reject filter may comprise a single-pole band reject filter that is configured to reject a transmit frequency. In addition, the receive band reject filter may be configured to have a reflection coefficient of one at zero degrees phase. The receive band pass filter may comprise a two-pole band pass filter that is configured to pass the receive frequency.

The transmit band reject filter may comprise a single-pole band reject filter that is configured to reject a receive frequency. The transmit band reject filter may be configured to have a reflection coefficient of one at zero degrees phase. The transmit band pass filter may comprise a two-pole band pass filter that is configured to pass the transmit frequency.

A mobile station with a tunable duplexer is disclosed. The mobile station includes means for processing and means for storing information in electronic communication with the means for processing. Means for transmitting and receiving wireless signals is also included.

The mobile station includes means for rejecting a transmit frequency in electronic communication with the means for transmitting and receiving wireless signals at a common node. Means for passing a receive frequency in electronic communication with the means for rejecting a transmit frequency is also included. Means for rejecting a receive frequency in electronic communication with the means for transmitting and receiving wireless signals at the common node is included. In addition, the mobile station also includes means for passing a transmit frequency in electronic communication with the means for rejecting a receive frequency.

A method in a mobile station that is configured for wireless communication is also disclosed. A transmit frequency and a receive frequency are obtained. A first single-pole band reject filter on a transmit path is tuned to reject the receive frequency. A two-pole first band pass filter on the transmit path is tuned to pass the transmit frequency. A second single-pole band reject filter on a receive path is tuned to reject the transmit frequency. A two-pole second band pass filter on the receive path is tuned to pass the receive frequency.

BRIEF DESCRIPTION OF THE DRAWINGS

FIG. 6 is a flow diagram of one embodiment of a method for tuning a duplexer using a common node notch filter in a mobile station.

DETAILED DESCRIPTION

Figure 1:
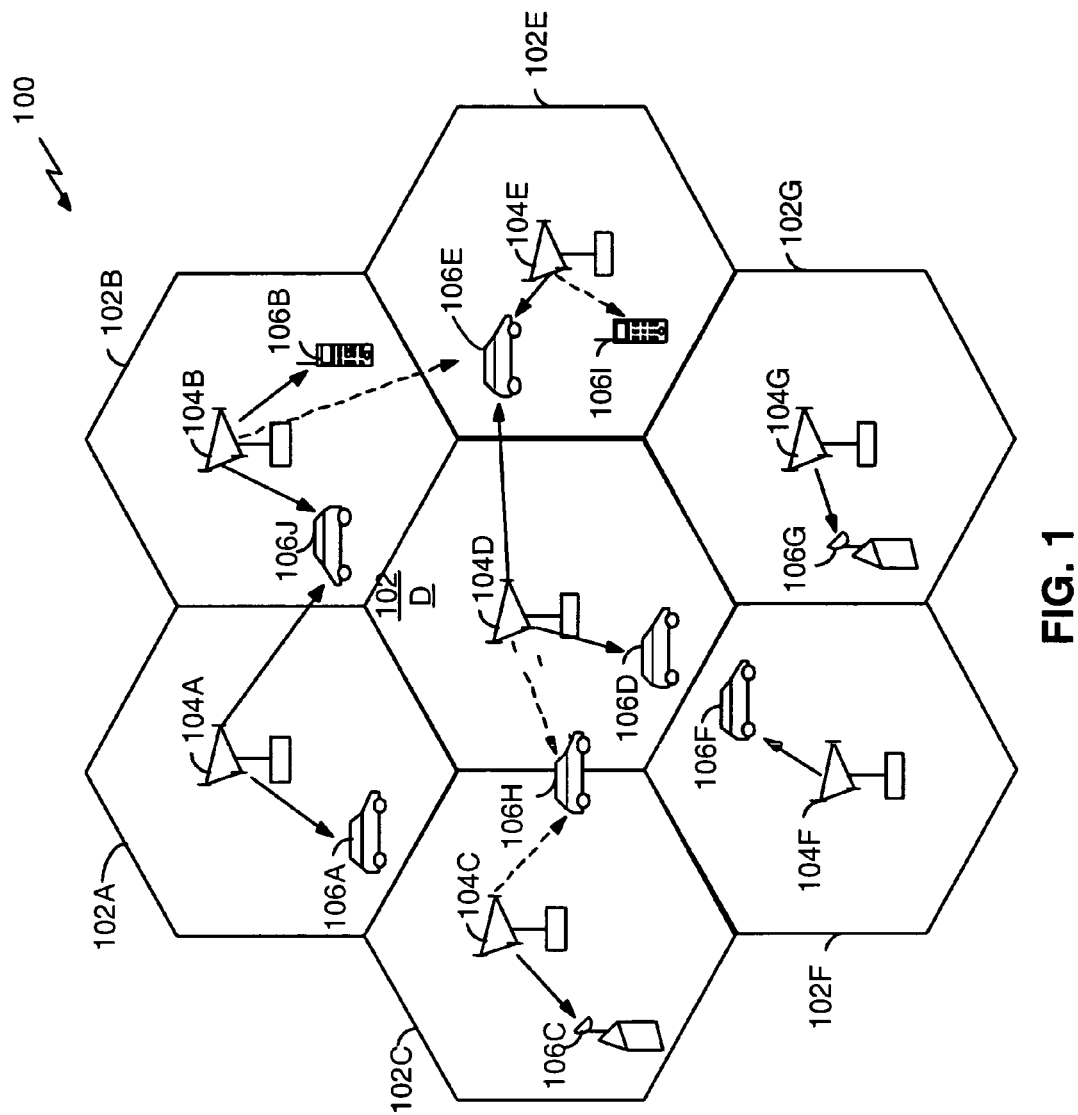
FIG. 1 illustrates an example of a communications system that supports a number of users and is capable of implementing at least some aspects of the embodiments discussed herein.

The word "exemplary" is used herein to mean "serving as an example, instance, or illustration." Any embodiment described herein as "exemplary" is not necessarily to be construed as preferred or advantageous over other embodiments.

Note that the exemplary embodiment is provided as an exemplar throughout this discussion, however, alternate embodiments may incorporate various aspects without departing from the scope of the present invention. Specifically, one embodiment is applicable to a data processing system, a wireless communication system, a mobile IP network and any other system desiring to receive and process a wireless signal.

Wireless communication systems are widely deployed to provide various types of communication such as voice, data, and so on. These systems may be based on Code Division-Multiple Access (CDMA), Time Division-Multiple Access (TDMA), or some other modulation techniques. A CDMA system provides certain advantages over other types of systems, including increased system capacity.

A wireless communication system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3GPP TS 25.211, 3GPP TS 25.212, 3GPP TS 25.213, and 3GPP TS 25.214, 3GPP TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC.

The systems and methods described herein may be used with High Data Rate (HDR) communication systems. An HDR communication system may be designed to conform to one or more standards such as the "cdma2000 High Rate Packet Data Air Interface Specification," 3GPP2 C.S0024-A, Version 1, March 2004, promulgated by the consortium "3rd Generation Partnership Project 2." The contents of the aforementioned standard are incorporated by reference herein.

An HDR subscriber station, which may be referred to herein as an Access Terminal (AT), may be mobile or stationary, and may communicate with one or more HDR base stations, which may be referred to herein as Modem Pool Transceivers (MPTs). An access terminal transmits and receives data packets through one or more modem pool transceivers to an HDR base station controller, which may be referred to herein as a Modem Pool Controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or landline phone. The communication channel through which the access terminal sends signals to the modem pool transceiver is called a reverse channel. The communication channel through which a modem pool transceiver sends signals to an access terminal is called a forward channel.

FIG. 1 illustrates an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Remote stations 106 in the coverage area may be fixed (i.e., stationary) or mobile. As shown in FIG. 1, various remote stations 106 are dispersed throughout the system. Each remote station 106 communicates with at least one and possibly more base stations 104 on a forward link and a reverse link at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System," which is assigned to the assignee of the present invention.

The forward link refers to transmission from a base station 104 to a remote station 106, and the reverse link refers to transmission from a remote station 106 to a base station 104. In the one embodiment, some of the remote stations 106 have multiple receive antennas and others have only one receive antenna. In FIG. 1, base station 104A transmits data to remote stations 106A and 106J on a forward link; similarly base station 104B transmits data to remote stations 106B and 106J, base station 104C transmits data to remote station 106C, and so on.

Figure 2:
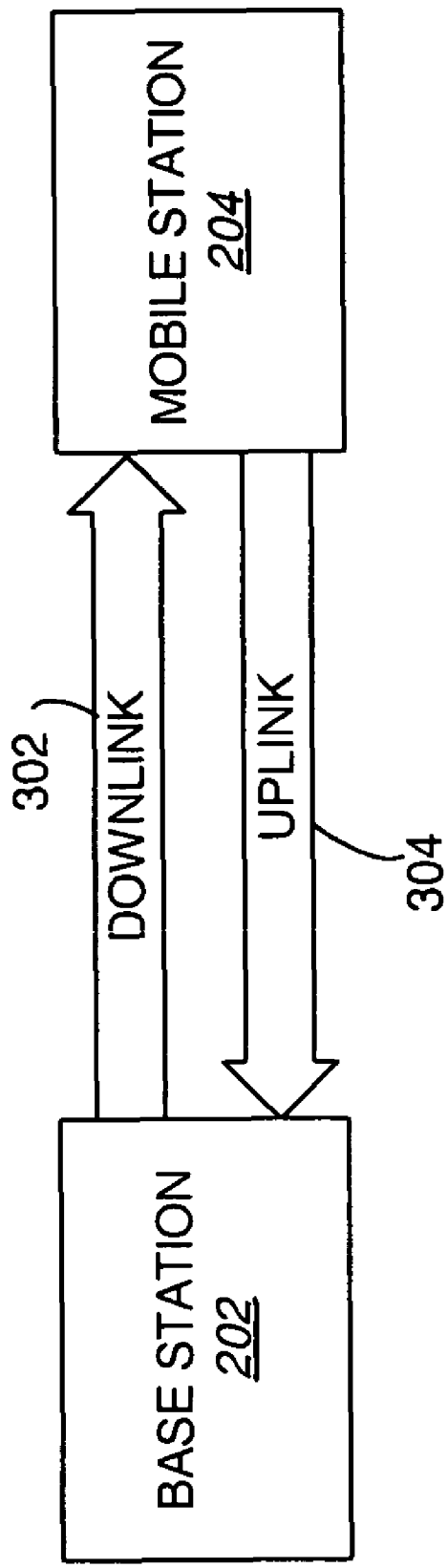
FIG. 2 is a block diagram of the base station and mobile station illustrating the downlink and the uplink.

FIG. 2 is a block diagram of the base station 202 and mobile station 204 in a communications system. A base station 202 is in wireless communications with the mobile station 204. As mentioned above, the base station 202 transmits signals to mobile stations 204 that receive the signals. In addition, mobile stations 204 also transmit signals to the base station 202.

FIG. 2 further illustrates a forward link, which may also be referred to as a downlink 302, and a reverse link, which may also be referred to as an uplink 304. The downlink 302 refers to transmissions from the base station 202 to the mobile station 204, and the uplink 304 refers to transmissions from the mobile station 204 to the base station 202.

Figure 3:
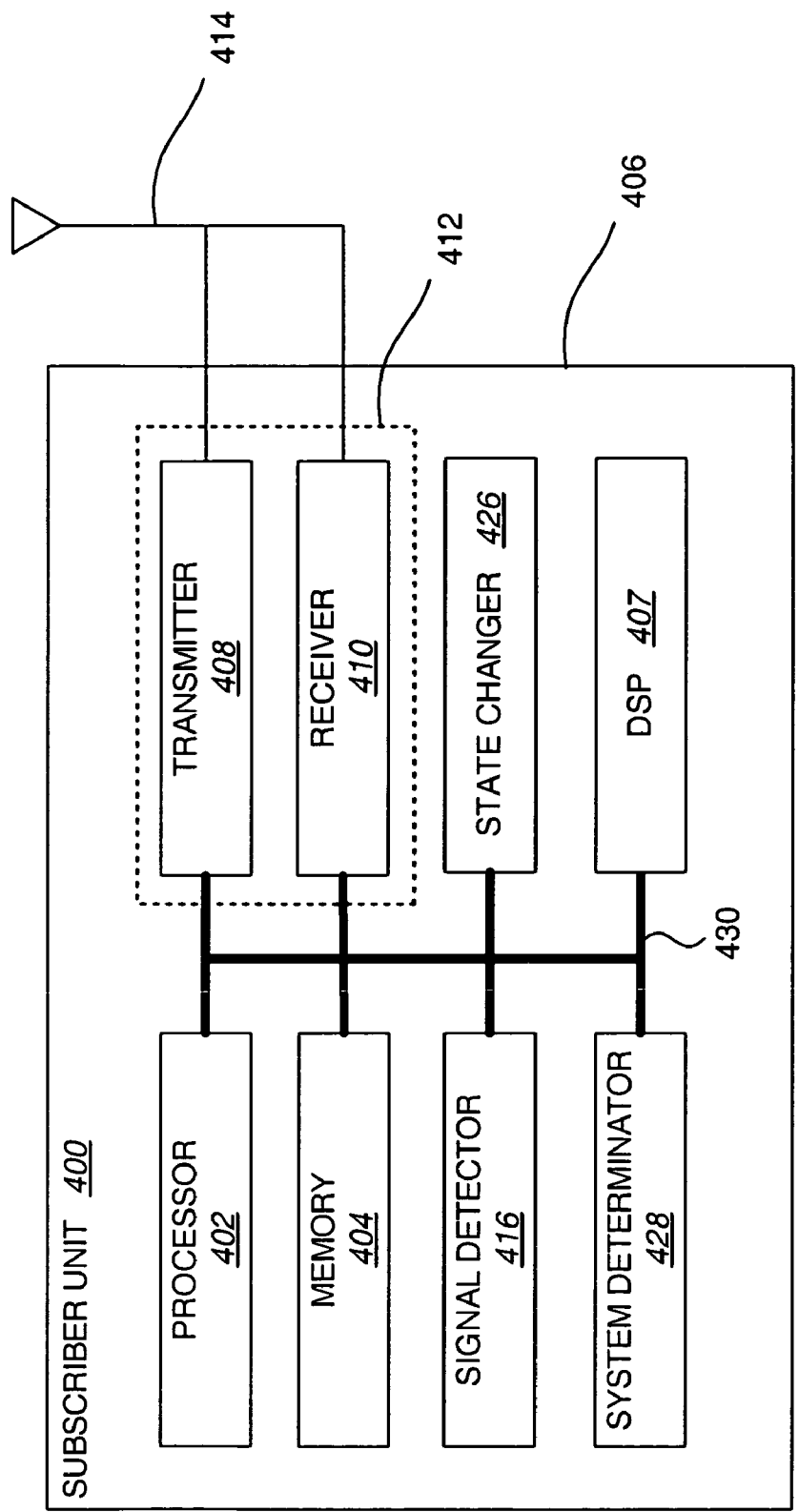
FIG. 3 is a functional block diagram of an embodiment of a subscriber unit.

An embodiment of a mobile station 204 is shown in a subscriber unit system 400 illustrated in the functional block diagram of FIG. 3. The system 400 includes a processor 402 which controls operation of the system 400. The processor 402 may also be referred to as a Central Processing Unit (CPU). Memory 404, which may include both Read-Only Memory (ROM) and Random Access Memory (RAM), provides instructions and data to the processor 402. A portion of the memory 404 may also include Non-Volatile Random Access Memory (NVRAM).

The system 400, which is typically embodied in a wireless communication device such as a cellular telephone, also includes a housing 406 that contains a transmitter 408 and a receiver 410 to allow transmission and reception of data, such as audio communications, between the system 400 and a remote location, such as a cell site controller or base station 202. The transmitter 408 and receiver 410 may be combined into a transceiver 412. An antenna 414 is attached to the housing 406 and electrically coupled to the transceiver 412. Additional antennas (not shown) may also be used. The operation of the transmitter 408, receiver 410 and antenna 414 is well known in the art and need not be described herein. The tunable duplexer with a common node notch filter will be described below.

The system 400 also includes a signal detector 416 used to detect and quantify the level of signals received by the transceiver 412. The signal detector 416 detects such signals as total energy, pilot energy per Pseudo-random Noise (PN) chips, power spectral density, and other signals, as is known in the art.

A state changer 426 of the system 400 controls the state of the wireless communication device based on a current state and additional signals received by the transceiver 412 and detected by the signal detector 416. The wireless communication device is capable of operating in any one of a number of states.

The system 400 also includes a system determinator 428 used to control the wireless communication device and determine which service provider system the wireless communication device should transfer to when it determines the current service provider system is inadequate.

The various components of the system 400 are coupled together by a bus system 430 which may include a power bus, a control signal bus, and a status signal bus in addition to a data bus. However, for the sake of clarity, the various busses are illustrated in FIG. 3 as the bus system 430. The system 400 may also include a Digital Signal Processor (DSP) 407 for use in processing signals. One skilled in the art will appreciate that the system 400 illustrated in FIG. 3 is a functional block diagram rather than a listing of specific components.

The methods disclosed herein may be implemented in an embodiment of a subscriber unit 400. The disclosed systems and methods may also be implemented in other communication systems with a receiver, such as a base station 202. If a base station 202 is being used to implement the disclosed systems and methods, the functional block diagram of FIG. 4 may also be used to describe components in a functional block diagram of a base station 202.

Figure 4:
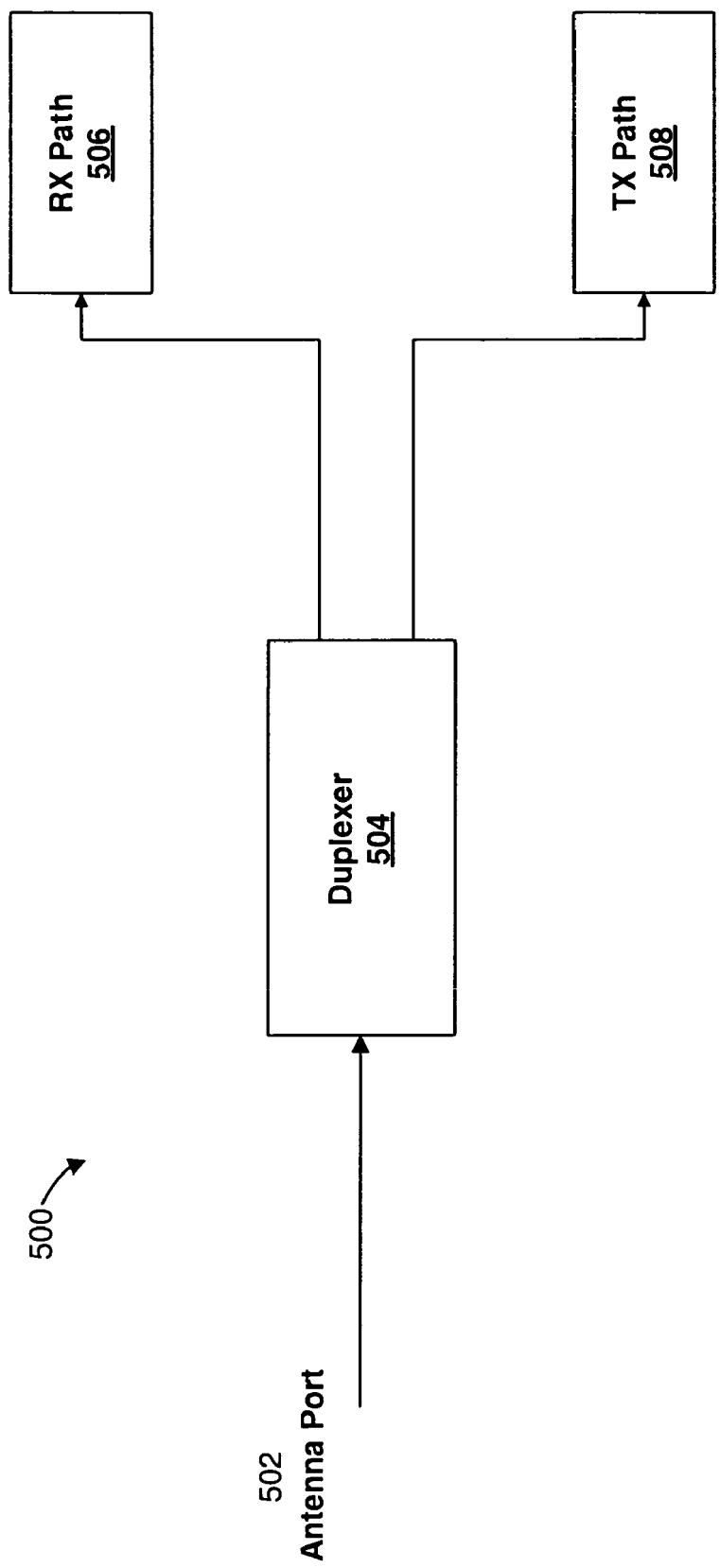
FIG. 4 is an overall block diagram of a tunable duplexer system in a mobile station.

FIG. 4 is an overall block diagram of a tunable duplexer system 500 in a mobile station 204 or in a subscriber unit 400. The system 500 receives and sends signals through an antenna port 502. The duplexer 504 is in electronic communication with the antenna port 502 and with the receive path (RX Path) 506 and the transmit path (TX Path) 508. The transmit 508 and receive 506 paths are electrically connected to the duplexer 504 in parallel via a common node 610 (shown in FIG. 5). The duplexer 504 performs both transmit and receive filtering. The duplexer 504 is designed to avoid leakage of the transmit signals into the receive path 506 and to avoid leakage of the receive signals into the transmit path 508. The duplexer disclosed herein isolates the transmit and receive signals with a simple topology.

Figure 5:
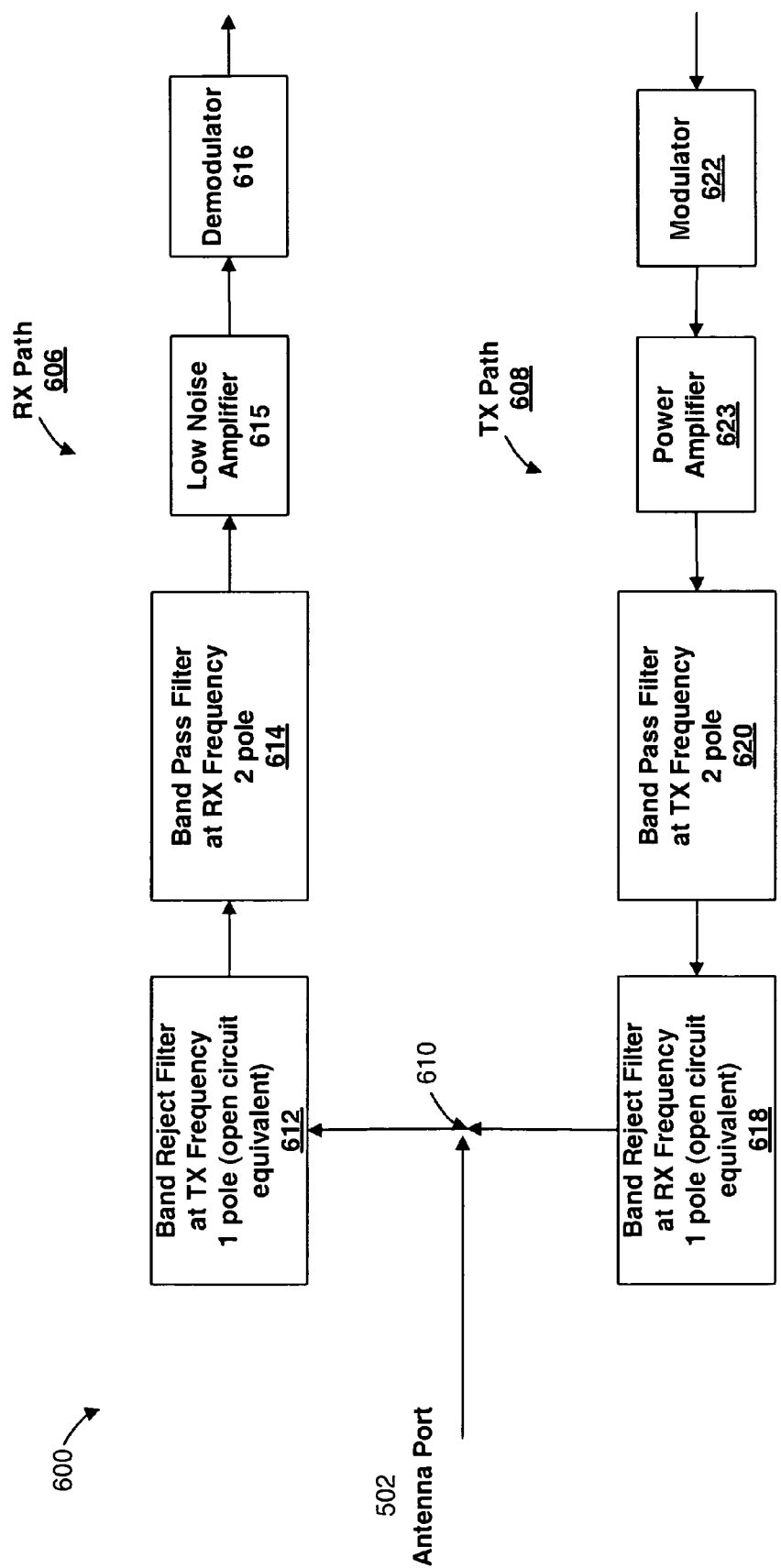
FIG. 5 is a more detailed block diagram of an embodiment of a tunable duplexer system.

FIG. 5 is a more detailed block diagram of an embodiment of a tunable duplexer system 600. The antenna port 502 is electrically connected to a common node 610. The transmit path 608 and the receive path 606 are electrically connected in parallel to the common node 610. The common node 610 is electrically connected to the input port of a tunable single-pole band reject filter 612 on the receive path 606. The output port of the receive path band reject filter 612 is connected to the input port of a tunable two-pole band pass filter 614. In concept a higher order filter could be used, but the ability to tune and control high order filters is more difficult and, as a result, it may be desirable to avoid a higher order filters in some scenarios. The output of the receive path band pass filter 614 is then provided to a low noise amplifier 615 and a demodulator 616.

The transmit path 608 includes a modulator 622. The signal from the modulator 622 is fed into a power amplifier 623 which is connected to a transmit path tunable two-pole band pass filter 620 that is tuned at the transmit frequency. As mentioned with respect to the receive path 606, in concept a higher order filter could be used, but the ability to tune and control high order filters is more difficult and, as a result, higher order filters may be avoided in some scenarios. The output port of the transmit path band pass filter 620 is connected to the input port of a transmit path tunable single-pole band reject filter 618. Similar to the receive path 606 the output port of the transmit band reject filter 618 is also electrically connected to the common node 610.

As shown, the duplexer 600 includes dual two-pole band pass filters 614, 620 connected to a common node 610 by embedding a band reject filter 612, 618 in each RF path 606, 608 that behaves as an open circuit to the undesired frequency. In the receive path 606, the receive band pass filter 614 is preceded by a band reject filter 612 that is an open circuit at the transmit frequency. The reflection coefficient of the band reject filter 612 is set to one at zero degrees phase.

Likewise in the transmit path 608, the transmit band pass filter 620 is followed by a band reject filter 618 that is an open circuit at the receive frequency. The reflection coefficient of the band reject filter 618 is set to one at zero degrees phase.

FIG. 6 is a flow diagram of one embodiment of a method for tuning a duplexer 600 using a common node notch filter in a mobile station. The mobile station 204 is provided at step 702 with new transmit and/or receive frequencies. One situation where this may occur is where the mobile station 204 is moving from one coverage area on one channel to another coverage area that uses a different channel. The base station 202 provides the new transmit and/or receive frequencies to the mobile station 204.

Once the new transmit and/or receive frequencies are obtained, the mobile station 204 tunes its filters at step 704. A number of different tuning operations are performed during this tuning step (704). The mobile station 204 tunes the band reject filter 618 on the transmit path 608 to the receive frequency so that it rejects the receive frequency. The band pass filter 620 on transmit path is also tuned to the transmit frequency to pass the transmit frequency.

The mobile station 204 tunes the band reject filter 612 on the receive path 606 to the transmit frequency so that it rejects the transmit frequency. The band pass filter 614 on the receive path 606 is also tuned to the receive frequency to pass the receive frequency. Once the filters have been tuned to the appropriate frequencies, then the mobile 204 may start normal call processing operation at step 712, and it may continue normal operation until it is again required to change either the transmit and/or receive frequencies.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, Electrically Programmable ROM (EPROM) memory, Electrically Erasable Programmable ROM (EEPROM) memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile station for use in a wireless communication system, the mobile station comprising a duplexer including a receive path and a transmit path:
   the receive path comprising:
      a tunable receive band reject filter adapted to receive signals from an antenna and a tunable receive band pass filter adapted to receive filtered signals from the receive band reject filter and;
   the transmit path comprising:
      a tunable transmit band reject filter is adapted to provide signals to the antenna and a tunable transmit band pass filter adapted to provide filtered signals to the transmit band reject filter;
   wherein at least one filter in the receive path is tunable to a first frequency and at least one other filter in the receive path is tunable to a second, different frequency upon receipt of one or more frequencies of a different channel assigned to the mobile station and at least one filter in the transmit path is tunable to the first frequency and at least one other filter in the transmit path is tunable to the second, different frequency upon receipt of the one or more frequencies of the different channel assigned to the mobile station.

2. The mobile station of claim 1, wherein the receive band reject filter comprises a single-pole band reject filter configured to reject a transmit frequency.

3. The mobile station of claim 1, wherein the transmit band reject filter comprises a single-pole band reject filter configured to reject a receive frequency.

4. The mobile station of claim 1, wherein the receive band reject filter comprises a single-pole band reject filter configured to reject a transmit frequency, and wherein the transmit band reject filter comprises a single-pole band reject filter configured to reject a receive frequency.

5. The mobile station of claim 4, wherein the receive band pass filter comprises a two-pole band pass filter configured to pass the receive frequency.

6. The mobile station of claim 5, wherein the transmit band pass filter comprises a two-pole band pass filter configured to pass the transmit frequency.

7. The mobile station of claim 6, wherein the receive band reject filter is configured to have a reflection coefficient of one at zero degrees phase.

8. The mobile station of claim 7, wherein the transmit band reject filter is configured to have a reflection coefficient of one at zero degrees phase.

9. The mobile station of claim 8, wherein the transmit band reject filter and the transmit band pass filter are both tunable filters such that the transmit band reject filter and the transmit band pass filter are tuned when the mobile station moves into a new coverage area.

10. The mobile station of claim 9, wherein the receive band reject filter and the receive band pass filter are both tunable filters such that the receive band reject filter and the receive band pass filter are tuned when the mobile station moves into a new coverage area.

11. In a wireless communication mobile station, a method comprising:
   obtaining a transmit frequency and a receive frequency;
   tuning a tunable band reject filter on a transmit path to reject the receive frequency;
   tuning a band pass filter on the transmit path to pass the transmit frequency;
   tuning a tunable band reject filter on a receive path to reject the transmit frequency; and
   tuning a band pass filter on the receive path to pass the receive frequency,
   wherein at least one filter in the receive path is tunable to a first frequency and at least one other filter in the receive path is tunable to a second, different frequency upon receipt of one or more frequencies of a different channel assigned to the mobile station and at least one filter in the transmit path is tunable to the first frequency and at least one other filter in the transmit path is tunable to the second, different frequency upon receipt of the one or more frequencies of the different channel assigned to the mobile station.

12. The method of claim 11, wherein the tunable band reject filter on the transmit path comprises a single-pole band reject filter.

13. The method of claim 11, wherein the band reject filter on the transmit path comprises a single-pole band reject filter.

14. The method of claim 11, wherein the tunable band reject filter on a receive path comprises a single-pole band reject filter.

15. The method of claim 11, wherein the band pass filter on the transmit path comprises a tunable band pass filter.

16. The method of claim 11, wherein the band pass filter on the receive path comprises a tunable band pass filter.

17. A mobile station for use in a wireless communication system, the mobile station comprising:
   means for obtaining a transmit frequency and a receive frequency;
   means for tuning a tunable band reject filter on a transmit path to reject the receive frequency;

means for tuning a tunable band pass filter on the transmit path to pass the transmit frequency;
means for tuning a tunable band reject filter on a receive path to reject the transmit frequency; and
means for tuning a tunable band pass filter on the receive path to pass the receive frequency,
wherein at least one filter in the receive path is tunable to a first frequency and at least one other filter in the receive path is tunable to a second, different frequency upon receipt of one or more frequencies of a different channel assigned to the mobile station and at least one filter in the transmit path is tunable to the first frequency and at least one other filter in the transmit path is tunable to the second, different frequency upon receipt of the one or more frequencies of the different channel assigned to the mobile station.

18. The method of claim 11, wherein the band reject filter on the receive path comprises a single-pole band reject filter.

* * * * *